UNITED STATES PATENT OFFICE.

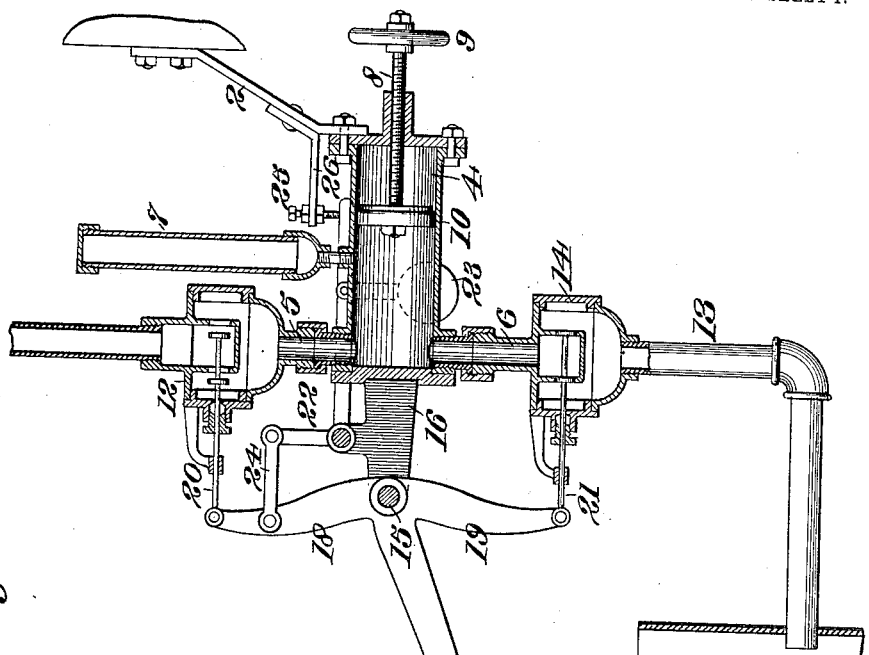

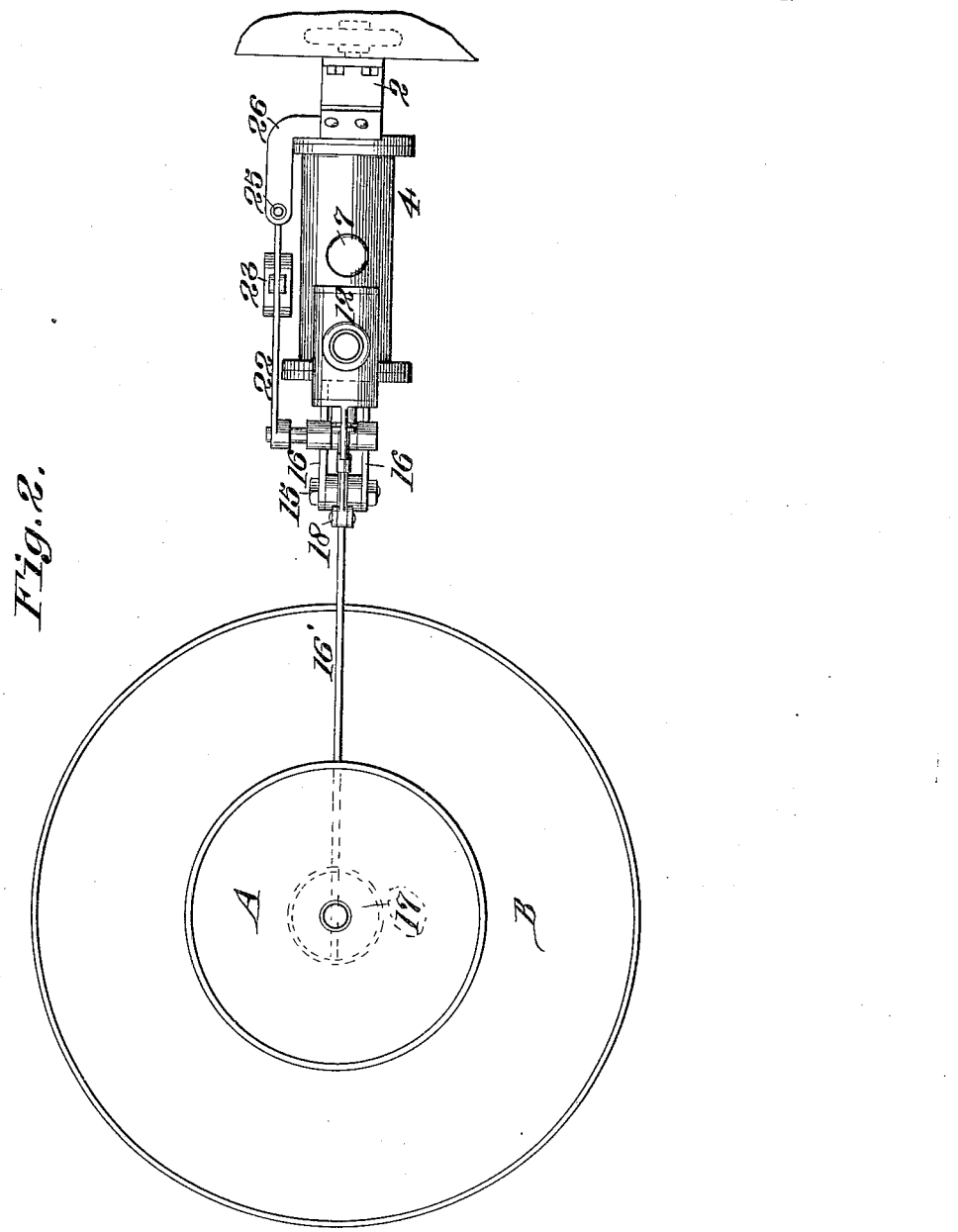

HORACE JOHNSON AND JAMES OGG, OF PAHALA, TERRITORY OF HAWAII.

LIMING APPARATUS.

1,126,222.  Specification of Letters Patent.  Patented Jan. 26, 1915.

Application filed January 12, 1914. Serial No. 811,779.

*To all whom it may concern:*

Be it known that we, HORACE JOHNSON, citizen of the United States, and JAMES OGG, a subject of the King of England, residing at Pahala, in the Province of Kau and Territory of Hawaii, have invented new and useful Improvements in Liming Apparatus, of which the following is a specification.

This invention relates to an apparatus for automatically adding a definite volume or measured quantity of milk of lime to raw sugar juice.

In the art of sugar making it is customary to treat raw sugar juices, prior to heating or boiling the same, with sufficient lime to bring the reaction to neutrality, or to any point short of or beyond neutrality, the particular point chosen depending upon the particular juice and the particular method of defecation chosen. It is very desirable that the amount of lime added to the juice be regulated with great exactness, since the exact liming is necessary to obtain a maximum quantity and quality of sugar in later apparatus.

The main object of this invention is to provide a mechanism for measuring and regulating with great exactness the amount of lime added to a previously measured or weighed quantity of raw juice.

Another object of the invention is to provide means for positively and automatically actuating said measuring mechanism every time a new quantity of raw juice is added to or delivered to the defecating apparatus.

Further objects will hereinafter appear.

The invention consists of the parts and the construction and combination of parts as hereinafter more fully described and claimed, having reference to the accompanying drawings, in which—

Figure 1 is a vertical sectional section through the lime milk measuring mechanism showing its position between the raw juice measuring tank and the defecating apparatus. Fig. 2 is a plan view of same.

Referring to the drawings, A indicates a tank adapted to receive a weighed or measured quantity of raw sugar juice, and B a portion of the tank or apparatus in which the defecating process takes place.

Attached to an arm 2, suitably supported from the side of a tank, stanchion or like device, a little below the discharge pipe 3 of the tank A, is a lime milk measuring mechanism, which is here shown as consisting of a cylinder 4 having inlet and outlet openings 5 and 6 communicating therewith, and an air chamber 7 connected in the usual manner. Extending through the end of the cylinder is a screw rod 8, having an operating handle 9 on its outer end and a piston 10 secured to its inner end. The quantity of lime milk admitted to the cylinder through the inlet opening 5 is varied by adjusting the position of the piston 10, within the chamber, through the medium of the screw-rod 8 and operating handle 9.

The lime milk to be measured and mixed with the raw sugar juice is first slaked and mixed to a known uniform density and kept at this density by means of a suitable mixing tank, pump and circulating pipes, not here shown. The supply lime milk is taken off of these circulating pipes and conveyed to the automatic measuring mechanism through a pipe 11. Interposed between the inlet opening 5 of the cylinder 4 and the pipe 11 is an automatically actuated valve 12, of suitable construction, but preferably of the so-called "balance type". Interposed between the outlet opening 6 of the cylinder 4 and the discharge pipe 13, which communicates with the defecating apparatus, is a similar valve 14.

Pivotally mounted, as at 15, upon an extension bracket 16, formed on one end of the cylinder 4, is a lever 16' having a shallow pan or dish 17 secured to its outer end. The inner end of the lever 16' is also provided with an upwardly extending arm 18 and a downwardly extending arm 19, and connecting the ends of said arms with the sliding balance valves 12 and 14 are links 20 and 21. The lever 16' is normally counterbalanced to hold the lever in the position indicated in Fig. 1 where the valves 12 and 14 are closed. This is accomplished by a bell-crank 22, having a counterweight 23 adjustably mounted on one end and a link 24 pivotally connected to the upper arm 18. The position of the lever 16 is furthermore adjusted and controlled by a stop screw 25 adjustably mounted in an arm 26.

The lever 16', holding the shallow pan 17 containing a small outlet opening 17ª, is so positioned as to extend directly under the discharge pipe 3 of the measuring tank, and the operation of the mechanism will be as follows: When the raw juice is discharged from the measuring tank it can be seen that the pan 17 will immediately be filled by the discharging juice and that the weight of this, together with the force of the falling liquid, will immediately depress the lever arm 16 and open valve 12 and correspondingly close valve 13. The lime of milk, kept in juxtaposition by the means previously described, is thus permitted to discharge from pipe 11 and valve 12 into the measuring cylinder 4 where the exact quantity of lime of milk is adjusted by the position of the piston 10, the position of the air chamber permitting a complete filling of the cylinder. The lever 16' will retain the valve 12 in an open position until the raw juices have been completely discharged and the pan 17 has become emptied by discharging through the opening 17ª. The counterweight will then act to raise the lever 16' to the normal position, indicated in Fig. 1, and will thus close the valve 12 and simultaneously open valve 13, thus permitting the exact measured quantity of lime of milk to be discharged into the defecating apparatus, indicated at B, where it is thoroughly mixed with the weighed or measured juice.

By regulating the screw, controlling the piston 10, the exact and desired quantity of lime of milk of uniform density can be regularly and automatically added to a measured or weighed quantity of raw juice. The position of the pan 17, actuating the lever 16, insures a positive and automatic actuation of the measuring apparatus, as the pan 17 will always be affected by the weight and force of the falling sugar juice. The power is thus transmitted through the levers and links to open or close the respective balanced slide valves which are of such a design as to work freely and positively with material, such as milk of lime.

The apparatus here shown is neat in appearance, substantial, reliable and automatic in its action and is so constructed that it may be successfully applied or attached to various forms and makes of defecating raw sugar juice measuring devices.

The materials and finish of the several parts of the lime milk measuring mechanism are such as experience and judgment of the manufacturer may dictate.

Having thus described our invention, what we claim and desire to secure by Letters Patent is—

1. The combination with a measuring tank, of a measuring cylinder, a pipe connecting the cylinder with a source of liquid supply, a discharge pipe connected with the cylinder, a valve in the inlet pipe, a valve in the discharge pipe, a lever pivotally mounted on one end of the measuring cylinder, a cross-arm on said lever, links connecting said cross-arm with the inlet and outlet valves respectively, a piston in the measuring cylinder, means for adjusting the position of said piston within said cylinder, and means controlled by the flow from the measuring tank for rocking the lever to open or close the valves.

2. The combination with a measuring tank, of a measuring cylinder, an intake pipe connecting the cylinder with a source of liquid supply, a discharge pipe connected with the cylinder, a valve in the inlet pipe, a valve in the discharge pipe, a lever pivotally mounted on one end of the measuring cylinder, a cross-arm on said lever, links connecting said cross-arm with the inlet and outlet valves respectively, a piston in the measuring cylinder, means for adjusting the position of said piston within said cylinder, and a cup secured on the end of the lever adapted to receive a portion of the flow passing from the measuring tank to depress the lever and actuate the valves.

3. The combination with a measuring tank, of a measuring cylinder, a pipe connecting the cylinder with a source of liquid supply, a discharge pipe connected with the cylinder, a valve in the inlet pipe, a valve in the discharge pipe, a lever pivotally mounted on one end of the measuring cylinder, a cross-arm on said lever, links connecting said cross-arm with the inlet and outlet valves respectively, and means controlled by the flow from the measuring tank for rocking the lever to open or close the valves.

4. The combination with a measuring tank, of a measuring cylinder, a pipe connecting the cylinder with a source of liquid supply, a discharge pipe connected with the cylinder, a valve in the inlet pipe, a valve in the discharge pipe, a lever pivotally mounted on one end of the measuring cylinder, a cross-arm on said lever, links connecting said cross-arm with the inlet and outlet valves respectively, a piston in the measuring cylinder, means for adjusting the position of said piston within said cylinder, means controlled by the flow from the measuring tank for rocking the lever to open or close the valves, and means for limiting the movements of the rocking lever.

5. The combination with a measuring tank, of a measuring cylinder, a pipe connecting the cylinder with a source of liquid supply, a discharge pipe connected with the cylinder, a valve in the inlet pipe, a valve in the discharge pipe, a lever pivotally mounted on one end of the measuring cylinder, a cross-arm on said lever, links connecting said cross-arm with the inlet and outlet valves respectively, a piston in the measuring cylinder, means for adjusting the position of said piston within said cylinder, means controlled by the flow from the measuring tank for rocking the lever to open or close the valves, means for limiting the movements of the rocking lever, and a counterweight for normally returning the rocking arm to a position where the valve in the inlet pipe will be open and the valve in the discharge pipe will be closed.

6. The combination with a measuring tank, of a measuring cylinder, an intake pipe connecting the cylinder with a source of liquid supply, a discharge pipe connected with the cylinder, a valve in the inlet pipe, a valve in the discharge pipe, a lever pivotally mounted on one end of the measuring cylinder, a cross-arm on said lever, links connecting said cross-arm with the inlet and outlet valves respectively, a piston in the measuring cylinder, means for adjusting the position of said piston within said cylinder, a cup secured on the end of the lever adapted to receive a portion of the flow passing from the measuring tank to depress the lever and actuate the valves, a secondary rocker arm connected with the first named rocker arm, an adjustable stop engageable with the secondary rocker arm, and a counter-weight on said arm.

In testimony whereof we have hereunto set our hands in the presence of two subscribing witnesses.

HORACE JOHNSON.
JAMES OGG.

Witnesses:
DAVID VAMIYOU,
LAURENCE C. PALMER.

Copies of this patent may be obtained for five cents each, by addressing the "Commissioner of Patents, Washington, D. C."